United States Patent
Reck et al.

(10) Patent No.: US 8,866,591 B2
(45) Date of Patent: Oct. 21, 2014

(54) IDENTIFICATION DEVICE FOR A PNEUMATIC SPRING

(75) Inventors: Siegfried Reck, Nienburg (DE); Hubertus Gawinski, Lauenau (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 735 days.

(21) Appl. No.: 13/070,999

(22) Filed: Mar. 24, 2011

(65) Prior Publication Data

US 2011/0205034 A1 Aug. 25, 2011

Related U.S. Application Data

(63) Continuation of application No. PCT/EP2009/060185, filed on Aug. 6, 2009.

(30) Foreign Application Priority Data

Sep. 25, 2008 (DE) .......................... 10 2008 048 961

(51) Int. Cl.
- *H04Q 5/22* (2006.01)
- *F16F 9/04* (2006.01)
- *F16F 9/32* (2006.01)

(52) U.S. Cl.
CPC ................. *F16F 9/04* (2013.01); *F16F 9/3264* (2013.01)
USPC ..................... 340/10.1; 340/572.1; 340/572.8; 340/10.51

(58) Field of Classification Search
None
See application file for complete search history.

(56) References Cited

U.S. PATENT DOCUMENTS

| | | | |
|---|---|---|---|
| 6,036,179 A | 3/2000 | Rensel | |
| 6,898,489 B1 | 5/2005 | Hayes, Sr. | |
| 7,298,268 B2 * | 11/2007 | Zimmerman et al. | 340/572.1 |
| 2005/0056502 A1 | 3/2005 | Maes | |
| 2006/0157900 A1 * | 7/2006 | Nordmeyer | 267/64.21 |
| 2006/0169386 A1 | 8/2006 | Egolf et al. | |
| 2007/0256485 A1 * | 11/2007 | Rensel et al. | 73/146 |

FOREIGN PATENT DOCUMENTS

| | | |
|---|---|---|
| CN | 2904127 Y | 5/2007 |
| EP | 1 985 886 A2 | 10/2008 |

OTHER PUBLICATIONS

International Search Report dated Oct. 6, 2009 of international application PCT/EP 2009/060185 on which this application is based.

* cited by examiner

Primary Examiner — Mohammad Ghayour
Assistant Examiner — Brian Wilson
(74) Attorney, Agent, or Firm — Walter Ottesen P.A.

(57) ABSTRACT

An identification device (1) for a pneumatic spring (2) includes an RFID transponder (8), which is completely embedded into the elastomer matrix (13) of the flexible member (4). An electromagnetic field is generated by a read device (9), wherein the energy necessary for supplying the RFID transponder (8) is taken from the electromagnetic field generated by the read device (9). When the read device (9) is active, information can be exchanged between the RFID transponder (8) and the read device (9). The RFID transponder (8) operates completely without an internal energy supply. The RFID transponder (8) may also be configured as a read/write transponder including a memory chip, wherein data may be stored on the memory chip in a safe and permanent manner. By retrieving data from the RFID transponder (8), an identification of the pneumatic spring (2) is possible even without any internal power supply of the RFID transponder.

7 Claims, 1 Drawing Sheet

IDENTIFICATION DEVICE FOR A PNEUMATIC SPRING

CROSS REFERENCE TO RELATED APPLICATIONS

This application is a continuation application of international patent application PCT/EP 2009/060185, filed Aug. 6, 2009, designating the United States and claiming priority from German application 10 2008 048 961.1, filed Sep. 25, 2008, and the entire content of both applications is incorporated herein by reference.

FIELD OF THE INVENTION

The invention relates to an identification device for a pneumatic spring, having one transmit memory device, one read unit and one data storage unit; the pneumatic spring comprising at least one piston, one cover and one flexible member/bellows, wherein the flexible member has at least one elastomer matrix.

BACKGROUND OF THE INVENTION

Such identification systems are known per se and are used, for example, in utility vehicles. For example, U.S. Pat. No. 6,036,179 discloses an identification system in which a memory unit which can be activated can store data which relate to a pneumatic spring, and can transmit the data to an interrogation device by means of a transmitter which is equipped with an internal power source.

In this context, the memory unit can be arranged either inside or outside the pneumatic spring. However, the transmit memory device disclosed in this document is relatively large and requires an internal battery which supplies the transmit memory device with power. Although batteries are relatively insensitive and durable, their service life is, however, limited. Furthermore, there is the risk of premature failure of the battery making the entire identification system inoperative. As a result of the size of the transmit memory device, there is also always the risk of the transmit memory device being damaged during mounting. Since the transmit memory device is subject to environmental influences, it also requires a correspondingly stable protective housing.

SUMMARY OF THE INVENTION

The invention is based on the object of providing an identification system whose transmit memory device permits reliable and cost-effective operation of the identification system without a service-life-limiting power supply while at the same time having a small size and being protected against environmental influences.

This object is achieved by virtue of the fact that the transmit memory device is embodied as a radio frequency identification transponder (RFID transponder) which is completely embedded in the elastomer matrix of the flexible member, an electromagnetic field can be generated by the read unit, and the RFID transponder has at least one device by which the energy necessary to supply the RFID transponder can be drawn from the electromagnetic field generated by the read unit, and that when energy is available to the RFID transponder, information can be exchanged between the RFID transponder and the read unit.

Such an identification system has the advantage that the RFID transponder does not require an internal power supply at all. Instead, the power is drawn from the electromagnetic field of the read unit, this then occurring only when the read unit is activated.

A wide variety of inexpensive RFID transponders of the specified type is commercially available. The electronic components of such RFID transponders are usually surrounded by a plastic encapsulation which holds the components together and protects them against external influences. As a result of the small size of the RFID transponders, the elastic behavior of the flexible member is changed only to a very small extent. If the sensor is, for example, arranged at a location which is stressed less in terms of deformation of the flexible member, this change can be ignored.

As a result of the RFID transponder being completely embedded in the elastomer matrix of the flexible member, the RFID transponder is very well protected against external influences in addition to its encapsulation.

In a further embodiment of the invention, the RFID transponder has an unambiguous and unique electronic component identifier which can be broadcast by the RFID transponder and received by the read unit, wherein the component identifier can be stored in the data storage unit, and the unique component identifier of the RFID transponder can be combined in the data storage unit with data which can be acquired during the production of the pneumatic spring and can be stored in the data storage unit, as a result of which the identity of the pneumatic spring can be determined in an unambiguous way.

In a further embodiment of the invention, the RFID transponder is embodied as a read/write transponder with a memory chip, wherein data can be reliably and permanently stored on the memory chip and, when energy is available to the RFID transponder, the data can be read into the memory chip by the read unit and/or can be read from the memory chip by the read unit.

As a result of the storage of data directly in the memory chip of the RFID transponder, reconciliation with data from the data storage unit is not necessary in order to determine the identity of the pneumatic spring. This also permits the pneumatic spring to be identified without access to the corresponding data processing system.

In a further embodiment of the invention, the data which are stored on the memory chip can be encrypted by means of encryption algorithms.

The encryption of the data provides a high level of data protection.

In a further embodiment of the invention, the data which are stored on the memory chip can be encrypted by means of at least one encryption algorithm which is integrated in terms of hardware into the memory chip.

In a further embodiment of the invention, the encryption algorithms can be changed at periodic or nonperiodic time intervals.

As a result of these properties of encryption, further improved data protection can be achieved.

The invention is furthermore based on the object of providing a method by means of which a rolling flexible member which is suitable for a pneumatic spring identification system can be manufactured.

This object is achieved by means of a method which has at least the following working steps, specifically construction of a flexible member blank from at least one reinforcement carrier layer and at least one nonvulcanized elastomer material, insertion of an RFID transponder into the elastomer material with the result that the RFID transponder is completely embedded in the nonvulcanized elastomer material, vulcanization of the flexible member.

For example, the RFID transponder can be applied directly to the reinforcement carrier layer where it is then covered by corresponding covering layers made of a rubber raw mixture. The subsequent vulcanization means that the RFID transponder is then completely surrounded by the elastomer material. In addition to the plastic encapsulation which usually surrounds the RFID transponder, the RFID transponder is very well protected against external influences by this arrangement.

In a further embodiment of the invention, the electronic components of the REID transponder are inserted directly into the nonvulcanized elastomer material without the encapsulation surrounding it.

As a result of the elimination of the plastic encapsulation, the RFID transponder becomes more economical and its rigidity with respect to elastic deformation is reduced. This has the advantage that less consideration has to be given to possible deformations of the completely vulcanized flexible member during the placing of the RFID transponder, since the elastic behavior of the completely vulcanized flexible member is changed to an even lesser degree by the RFID transponder which is now more elastic.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
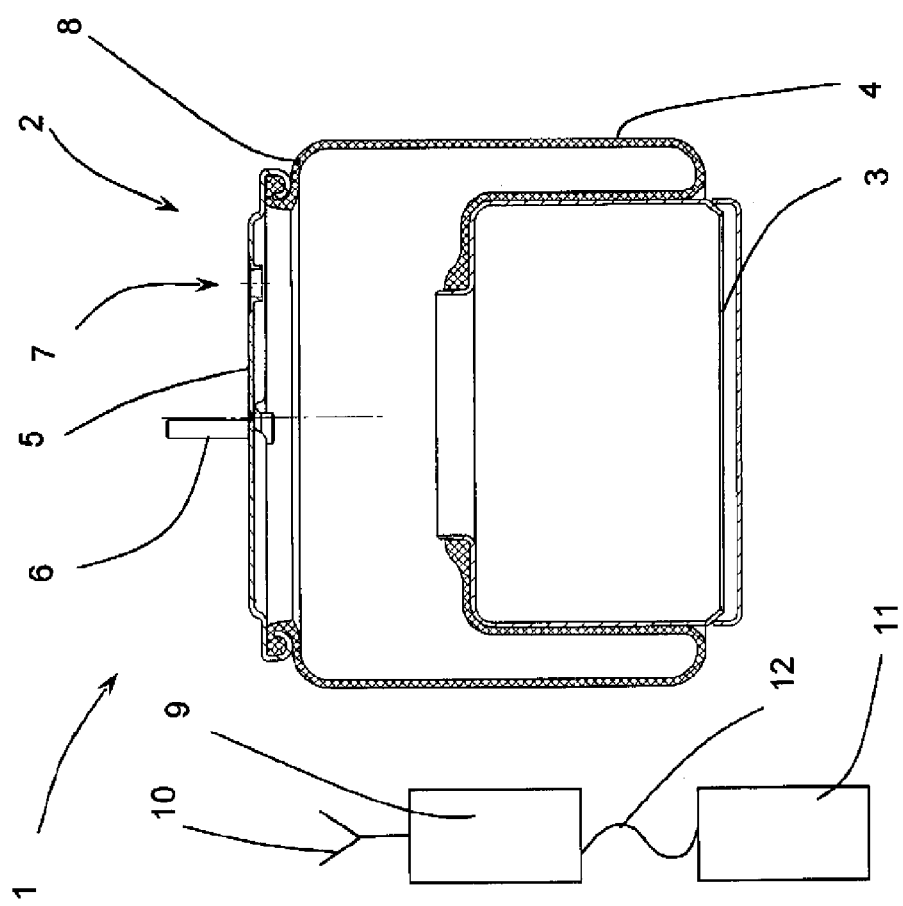
FIG. 1 shows a pneumatic spring identification system as a basic illustration; and, FIG. 2 shows an enlarged detail of the pneumatic spring from FIG. 1.

FIG. 1 shows a pneumatic spring identification system 1 having a pneumatic spring 2. The pneumatic spring 2 has a piston 3, a flexible member 4 and a cover 5, wherein the cover 5 has an attachment bolt 6 and an air port 7. An RFID transponder 8 is embedded in the flexible member 4. A read unit 9 with an antenna 10 is connected to a data storage unit 11 via a cable 12, and is operatively connected to the RFID transponder 8 via a magnetic field (not shown).

Figure 2:
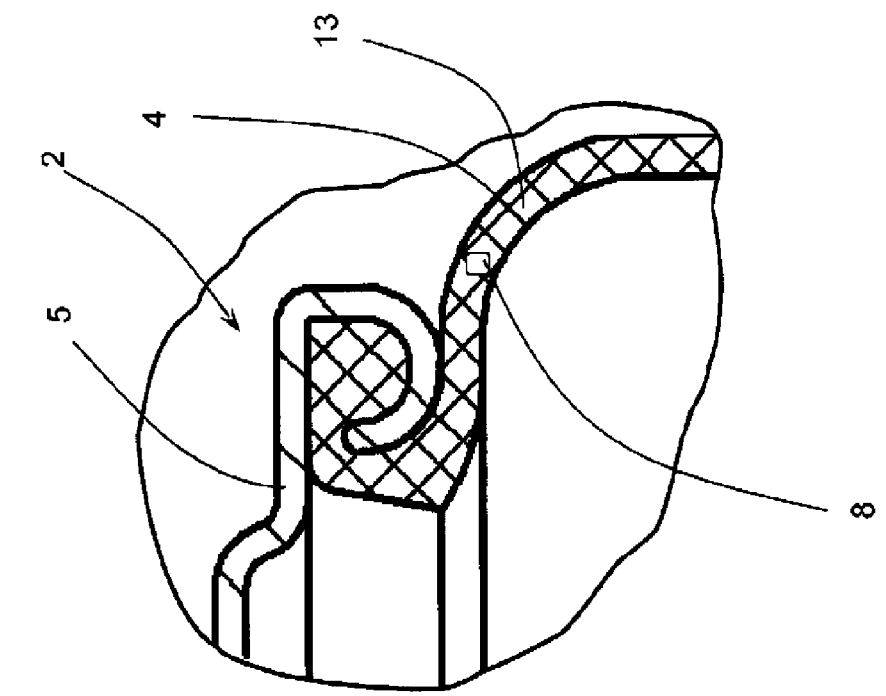

FIG. 2 shows an enlarged detail of the pneumatic spring 2. The flexible member 4 is attached in an airtight fashion to the cover 5. The RFID transponder 8 is completely surrounded by the elastomer matrix 13 of the flexible member 4.

The RFID transponder 8 draws its energy via an integrated antenna (not shown here) from the electrical field (likewise not shown here) which is generated by the read unit 9, and in the process the RFID transponder 8 transmits data to the read unit 9. The data from the RFID transponder 8 can be transmitted to the data storage unit 11 via the cable 13. The data which are stored in the data storage unit 11 can be further processed in a data processing system (not shown), with the result that the identity of the pneumatic spring 2 can be determined.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description

1 Pneumatic spring identification system
2 Pneumatic spring
3 Piston
4 Flexible member/bellows
5 Cover
6 Attachment bolt
7 Air port
8 RFID transponder
9 Read unit
10 Antenna of the read unit 9
11 Data storage unit
12 Cable between the read unit 9 and the data storage unit 11
13 Elastomer matrix of the flexible member 4

What is claimed is:

1. A pneumatic spring comprising:
a roll-off piston;
a cover;
a rolling-lobe flexible member having a predetermined length and having a first end connected to said cover and a second end connected to said roll-off piston;
said rolling-lobe flexible member being subject to less stress in terms of deformation of said rolling-lobe flexible member at a location in close proximity to said cover than elsewhere along said predetermined length thereof;
said rolling-lobe flexible member having an elastomer matrix;
an unencapsulated transmit memory device embedded in said elastomer matrix of said rolling-lobe flexible member while unvulcanized and at said location and being configured as a radio frequency identification transponder (RFID transponder);
a read unit operatively connected to said RFID transponder and being configured to generate an electromagnetic field;
said RFID transponder being configured to draw energy necessary to supply said RFID transponder from said electromagnetic field; and,
said RFID transponder being so configured that when said energy is available to said RFID transponder information is exchanged between said RFID transponder and said read unit.

2. The pneumatic spring of claim 1, further comprising:
a data storage unit;
said RFID transponder having an unambiguous and unique electronic component identifier which is transmitted by said RFID transponder and received by said read unit;
said data storage unit being configured to store said unambiguous and unique electronic component identifier; and,
said unambiguous and unique electronic component identifier in said data storage unit being combinable with data, which is acquired during production of said pneumatic spring, so as to cause the identity of said pneumatic spring to be determined in an unambiguous manner.

3. The pneumatic spring of claim 1, wherein:
said RFID transponder is a read/write RFID transponder having a memory chip;
said memory chip of said RFID transponder being configured to reliably and permanently store data and configured to have said data read into said memory chip by said read unit and/or to have said data read from said memory chip by said read unit when said energy is available to said RFID transponder.

4. The pneumatic spring of claim 3, wherein said data stored on said memory chip is encrypted by encryption algorithms.

5. The pneumatic spring of claim 4, wherein said encryption algorithms is are changed in at least one of periodic intervals and nonperiodic intervals.

6. The pneumatic spring of claim 3, wherein said data stored on said memory chip is encrypted by at least one encryption algorithm which is integrated into the hardware of said memory chip.

7. The pneumatic spring of claim 1, wherein said RFID transponder operates completely without an internal energy supply.

\* \* \* \* \*